US008443171B2

(12) United States Patent
Morris et al.

(10) Patent No.: US 8,443,171 B2
(45) Date of Patent: May 14, 2013

(54) RUN-TIME UPDATING OF PREDICTION HINT INSTRUCTIONS

(75) Inventors: Dale Morris, Steamboat Springs, CO (US); James E. McCormick, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1701 days.

(21) Appl. No.: 10/903,155

(22) Filed: Jul. 30, 2004

(65) Prior Publication Data

US 2006/0026408 A1 Feb. 2, 2006

(51) Int. Cl.
*G06F 9/30* (2006.01)

(52) U.S. Cl.
USPC ............ 712/207; 712/226; 712/233; 712/239

(58) Field of Classification Search .................. 712/207, 712/226, 233, 239
See application file for complete search history.

(56) References Cited

U.S. PATENT DOCUMENTS

| | | | | |
|---|---|---|---|---|
| 5,742,804 A | * | 4/1998 | Yeh et al. ...................... | 712/237 |
| 5,887,159 A | * | 3/1999 | Burrows ...................... | 712/226 |
| 6,233,679 B1 | | 5/2001 | Homberg | |
| 6,477,639 B1 | * | 11/2002 | Krishnan et al. .............. | 712/237 |
| 6,535,962 B1 | | 3/2003 | Mayfield | |
| 6,560,693 B1 | | 5/2003 | Puzak | |
| 6,662,360 B1 | | 12/2003 | Hay | |
| 2001/0016903 A1 | | 8/2001 | Tremblay | |
| 2002/0095566 A1 | * | 7/2002 | Sharangpani et al. ........ | 712/239 |
| 2003/0212881 A1 | | 11/2003 | Walterscheidt | |
| 2004/0117557 A1 | | 6/2004 | Paulraj | |
| 2004/0123081 A1 | | 6/2004 | Knies | |

FOREIGN PATENT DOCUMENTS

| | | |
|---|---|---|
| EP | 0847004 A1 | 10/1996 |
| JP | 63075934 A | 8/1988 |

OTHER PUBLICATIONS

Koopman, Philip. "Cache Data Organization". Sep. 14, 1998, pp. 1-24.*

* cited by examiner

*Primary Examiner* — Robert Fennema

(57) ABSTRACT

The present invention provides a system and method for runtime updating of hints in program instructions. The invention also provides for programs of instructions that include hint performance data. Also, the invention provides an instruction cache that modifies hints and writes them back. As runtime hint updates are stored in instructions, the impact of the updates is not limited by the limited memory capacity local to a processor. Also, there is no conflict between hardware and software hints, as they can share a common encoding in the program instructions.

28 Claims, 4 Drawing Sheets

RUN-TIME UPDATING OF PREDICTION HINT INSTRUCTIONS

BACKGROUND OF THE INVENTION

The present invention relates to computers and, more particularly, to computers that execute branch instructions. A major objective of the invention is to enhance performance by improving predictions required for speculative processing, e.g., as used for pre-fetching data and instructions. Related art is discussed below to help explain a problem addressed by the present invention. Related art labeled as "prior art" is admitted prior art; related art not labeled as "prior art" is not admitted prior art.

Much of modern progress is associated with the pervasiveness of computers that manipulate data in accordance with programs of instructions. Given a never-ending demand for increased speed, the computer industry has taken pains to minimize delays in processing. In some cases, operations can be performed out of program order so the results are available as soon as they are required. For example, certain instructions and data can be pre-fetched into a cache before their execution is required; when they are called for, they can be accessed quickly from a cache instead more slowly from main memory. Many operations are not fully specified or known until the results of logically preceding operations are known. For example, an address pre-fetch might require determination of the results of a conditional branch instruction that has not yet been executed. In such cases, some speculative pre-processing can be performed advantageously when the outcome of the prerequisite operations can be predicted with sufficient success.

In a software approach to prediction, a program can include prediction hints in the instructions themselves. Typically, a compiler program provides these either in response to a programmer's specifications or in accordance with the program's analysis of the program structure. For example, a branch instruction can include a field that denotes "this branch is usually (or, alternatively, rarely) taken". In a hardware approach to prediction, processing results can be tracked and the resulting processing history can be used to predict future results. For example, if a branch instruction has resulted in repeated returns to the beginning of a loop, the processor can pre-fetch the beginning of the loop the next time the branch instruction is encountered.

The hardware approach has access to recent runtime data, which is not available at compilation time. On the other hand, the compiler has access to the program as a whole, while the hardware typically has access to only a small portion of a program at a time. In practice, a processor should be able to access prediction results within a processor cycle or two. However, the memory available to store such results within this time requirement is very limited. As programs have grown exponentially over time, the portion of a program that can be represented by stored prediction results is growing smaller.

SUMMARY OF THE INVENTION

The present invention provides a system and method for runtime updating of hints in program instructions. The invention also provides for programs of instructions that include hint performance data. Also, the invention provides an instruction cache that modifies hints and writes them back. As runtime hint updates are stored in instructions, the impact of the updates is not limited by the limited memory capacity local to a processor. Also, there is no conflict between hardware and software hints, as they can share a common encoding in the program instructions. These and other features and advantages of the invention are apparent from the description of specific embodiments below with reference to the following drawings.

BRIEF DESCRIPTION OF THE DRAWINGS

The figures below depict specific embodiments of the invention and are not depictions of the invention itself.

DETAILED DESCRIPTION

Figure 1:
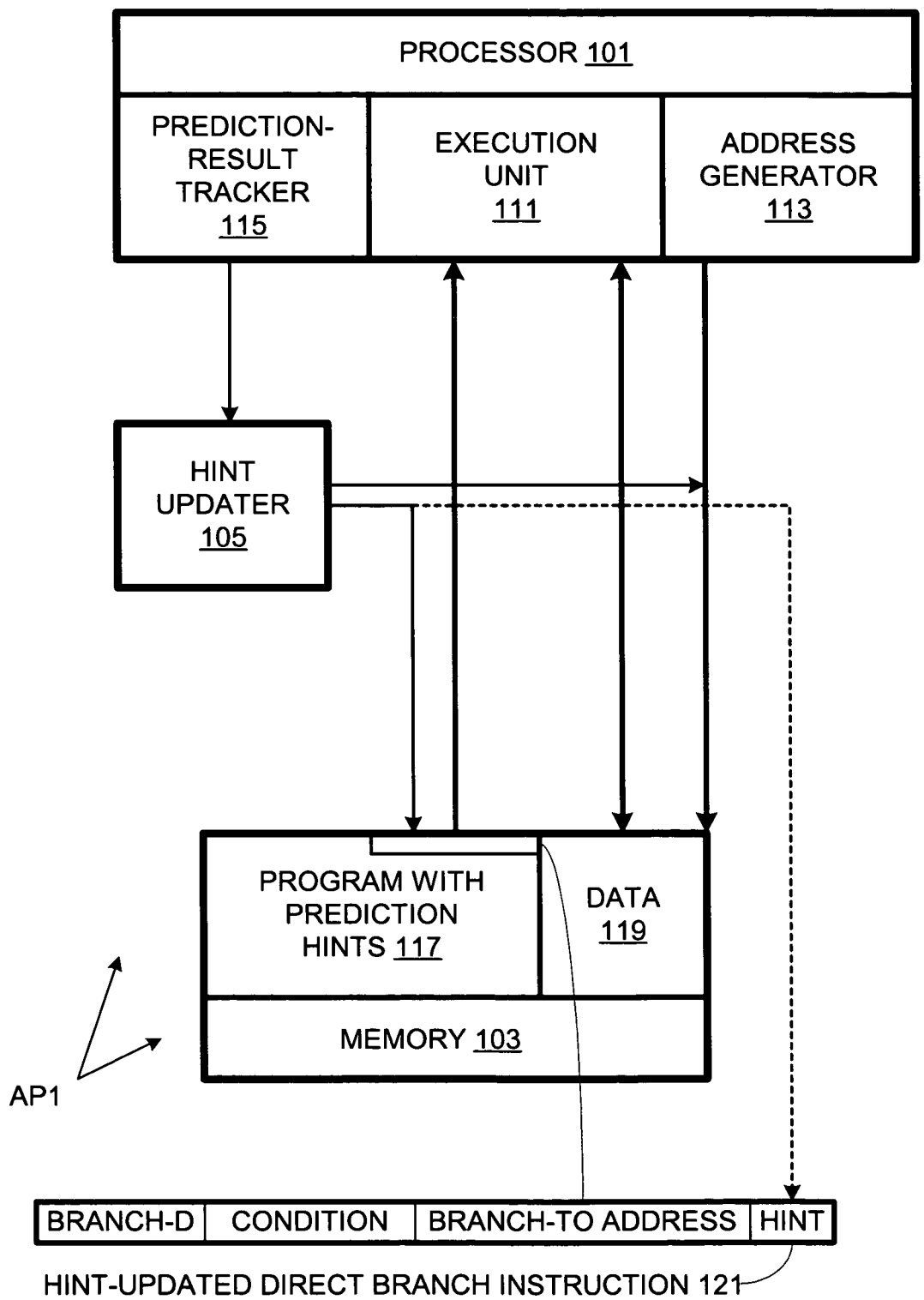
FIG. 1 is a block diagram of a first computer system in accordance with the present invention.

In accordance with the invention, a computer system AP1 comprises a processor 101, memory 103, and a hint updater 105. In this embodiment, hint updater 105 includes firmware that translated branch history data into hints to be incorporated in hint-type instructions.

Processor 101 includes an execution unit 111, an address generator 113, and a prediction-result tracker 115. Address generator 113 generates addresses for accessing locations in memory holding programs, e.g., a program 117 and data 121. Execution unit 111 executes instructions fetched from memory 103. Prediction-result 115 tracks the results of conditional branch instructions.

Upon compilation, program 117 includes instructions with branch-prediction hints. For example, program 117 includes direct branch instructions that specify a condition for branching, a branch-target (i.e., branch-to) address, and a three-bit hint value, as indicated for direct branch instruction 121, shown in FIG. 1. The compiler can introduce these hints either as directed by a programmer's source code or by its own analysis of the program structure. During execution, address generator 113 uses these hints to pre-fetch instructions that are likely to be branch targets in the near future.

When a branch instruction is executed, prediction tracker 115 determines whether or not the branch is actually taken. Hint updater 105 uses these branch-determination results to update hint information in program 117 as stored in memory 103. In system AP1, each direct branch instruction has a three-bit branch prediction field indicating seven levels of branch prediction and a "don't track" indication. This field can be thought of as a counter that is initiated when the program is compiled. Generally, each time a branch is taken, hint updater increments the branch-prediction value up to a maximum; each time the branch is not taken, the updater decrements the branch prediction value down to a minimum.

Each direct branch instruction includes a 3-bit branch-prediction field that encodes branch prediction information as shown in the following Table I.

TABLE I

| Hint encoding | |
|---|---|
| Count | Meaning |
| 011 | very likely to branch |
| 010 | moderately likely to branch |

TABLE I-continued

Hint encoding

| Count | Meaning |
|---|---|
| 001 | somewhat likely to branch |
| 000 | equally likely to branch or not branch |
| 100 | somewhat unlikely to branch |
| 101 | moderately unlikely to branch |
| 110 | very unlikely to branch |
| 111 | do not track branching |

At program compilation, the compiler program sets these bits for each direct branch instruction either according to its analysis of the program structure or as directed by the programmer. During program execution, processor 101 generally pre-fetches branch targets when the branch instruction reads "001", "010" or "011" and does not pre-fetch otherwise. However, for intermediate values such as "100", "000" and "001", the pre-fetch algorithm can take into account the availability of time and space required for the fetching.

Prediction-result tracker 115 tracks the result of each branch instruction. Hint updater 105 increments up to the maximum value (011 binary, 3 decimal) each time a branch is taken and decrements the hint count down to the minimum value (110 binary, −3 decimal) each time a branch is not taken. It is the copy of an instruction stored in memory 103 that is updated, as opposed to some ephemeral copy in a pipeline or execution unit. The next time the instruction is called, the new hint information guides the branch prediction to determine whether or not to pre-fetch. The exception is that if the field reads "111" ("do not track branching"), no change occurs.

In system AP1, both the software and hardware approaches to prediction are used. Moreover, the hardware-generated hints are encoded in the "language" of the software-generated hints, so compatibility issues between the approaches are minimized. Since the run-time hints are stored in the program instructions themselves, the storage capacity available for storing the hints can scale with the program size. A run-time result obtained early in program execution can benefit much later executions. Thus, the invention provides the relevancy advantage of the hardware approach to prediction and the capacity advantage of the software approach to prediction with negligible conflict between the approaches.

In system AP1, hint updater 105 is basically a firmware device that is separate from both processor 101 and memory 103. Alternatively, a hint updater can be hardware or software; also, it can reside in memory on or on-chip with the processor. In addition to handling direct branch instructions, it can handle pre-fetching for indirect branch instructions (e.g., instructions with addresses that must be calculated), and data. In addition, the predictions are not limited to those that are used for pre-fetching, but can be used, for example, to make speculative calculations on a predicted operand.

Figure 2:
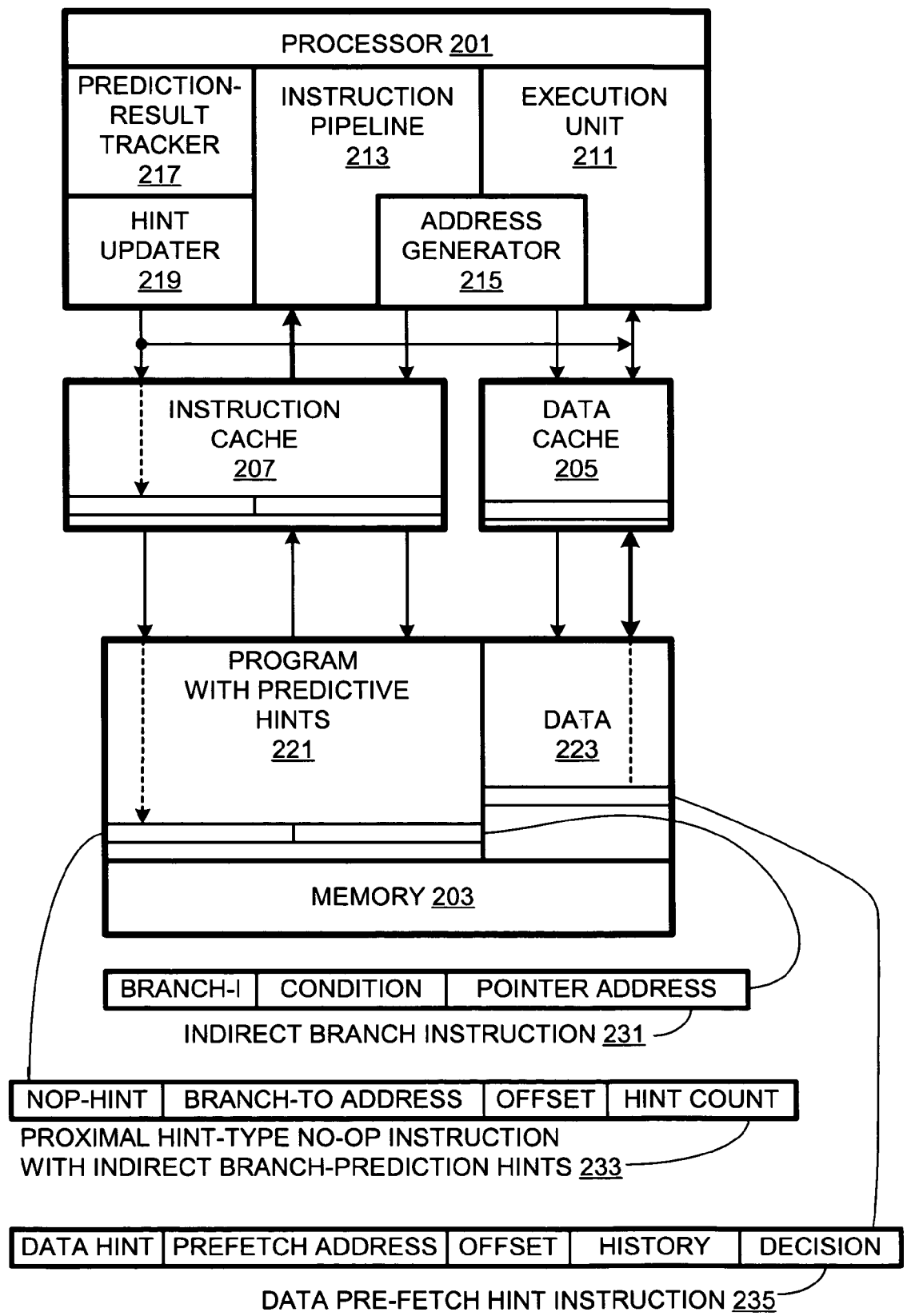
FIG. 2 is a block diagram of a second computer system in accordance with the present invention.

A second embodiment of the invention in the form of a second computer system AP2 is shown in FIG. 2. System AP2 includes a processor 201, memory 203, a data cache 205, and an instruction cache 207. Processor 201 includes an execution unit 211, an instruction pipeline 213, an address generator 215, a prediction-result tracker 217, and a hint updater 219. Memory 213 stores a program 221 and data 223.

When processor 201 executes a branch instruction, tracker 217 captures the result including whether or not the branch was taken and, in the case of an indirect branch instruction, e.g., 231, the branch-target address. Hint updater 219, in this case, built into processor 201, updates a copy of the instruction in instruction cache 207. In the case of a direct branch instruction, a hint field is incremented or decremented as it is for system AP1 in FIG. 1. In the case of indirect branch instruction, it is an immediately preceding hint-type no-op instruction 233 that is updated.

The hint-type no-op instruction 233 specifies a predicted branch-target address, an address offset, and a hint count. The hint count can be set so that branches for the indirect branch instruction are not tracked; in that case, the branch-target address and offset fields are meaningless. A programmer or compiler can set an initial branch-target address, offset, and 3-bit hint count. During execution, hint updater 219 increments (up to a maximum) the counter when a branch is taken to a predicted branch-target address and decrements (down to a minimum) when the branch is not taken or is taken to an address that is not predicted. If the programmer or compiler does not provide an initial address and offset, the hint count can set to zero or to a negative number.

Hint updater 219 works with instructions that use the same branch-target address repeatedly and with instructions for which successive branch-target addresses form an arithmetic series. In the former case, the offset value is zero; in the later case, the offset value is the difference in bytes between successive addresses. If the difference in bytes exceeds the eight-bit coding range for the offset value, the possible existence of an arithmetic series is ignored. This algorithm is further explained by example below.

In an example with an indirect branch instruction in which tracking is enabled but the hint count is zero, a branch upon execution results in the hint count in a hint-type no-op instruction being incremented to one. The captured branch-target address is written in the branch-target ("branch-to) address field of the hint-type no-op. The offset is set or maintained at zero. These changes are made to the copy of the hint-type instruction in instruction cache 207. The updated instruction is written back to program memory according to a write-back strategy if the copy in cache is to be invalidated or replaced. Note that instruction cache 207 differs from conventional instruction caches in providing for write-back. In an alternative embodiment, the hint updater copies the updated instruction to a data cache so that the data cache handles the write back.

An initialized hint-type no-op specifies no branch-target address, the offset value is meaningless, and the hint count is zero. Upon first execution of the associated indirect branch instruction, if the branch is not taken, the hint count is decremented to a value of negative one. If a branch is taken, the branch-target address is entered in the branch-target address field, the offset value is set to zero, and the hint count is set to one. The following discussion assumes a branch has been taken.

When the hint instruction is next executed, the indicated branch-target address is fetched if it is not already represented in the instruction cache. If, when the corresponding branch instruction is executed, it is determined that the instruction does not take the branch, the counter is decremented, in this case to zero. If a branch is taken to the predicted address, the hint count is incremented. If a branch is taken to a different address, the new branch-target address replaces the former one in the branch-target field of the hint-type no-op instruction. If the new address is within 128 bytes of the former address, an eight-bit offset value is entered that reflects the displacement and the hint count is incremented, in this case to two. If the new address is outside the 8-bit offset range, zero offset is retained and the hint count is decremented.

In the case of an instruction with a specified branch-target address and a non-zero offset and hint count, the specified predicted address is the sum of most recently taken branch-target address plus the offset. If this branch is taken, a new address (the old address plus the offset) replaces the former address, the offset is maintained, and the hint count is incremented up to a maximum value of 3. If the previously taken branch-target address (as identified by the predicted address less the offset) is taken, it overwrites the previously predicted branch-target address and the hint count is set to two and the offset is set to zero. If a new address for which an 8-bit offset can be specified is the branch-target address, this is entered as the new branch-target address, the newly determined offset is entered, and the count is set to two. If an out of range branch occurs, the new address, zero offset and count of one are entered. Whenever a branch is not taken, the hint count is decremented down to a minimum of −3. If it is decremented to zero or below (down to negative three), the specified branch-target address is not pre-fetched.

System AP2 also provides for pre-fetching data. A data pre-fetch hint instruction 235 specifies a pre-fetch address, an offset, a history, and a decision. The pre-fetch address and offset work like the branch-target address and offset for instruction 233. However, instead of a hint count, data pre-fetch instruction 235 has a history field and a decision field. This history field is effectively a 24-bit shift register is which each bit value corresponds to a result of the prediction. The decision field includes a decision bit indicating whether the prediction should be followed or not. A characteristic of the extended raw history over the count is that the former is more resistant to temporary failures of a prediction. The presence of the decision bit relieves the processor of the actual pre-fetch decision, while the history preserves information for the hint updater to use in setting the decision bit.

TABLE II

Instructions Used by System AP2

| Instruction [parameters] | Comments |
| --- | --- |
| Branch-D [condition, branch-target address, branch prediction (3-bit)]. | Direct branch instruction |
| Branch-I [condition, pointer location]. | Indirect branch instruction (hint is in separate instruction, see next instruction). |
| Hint-type NOP [Branch-target address, address offset, and hint count (3-bits).] | Applies to next indirect branch instruction in program order. |
| Data Pre-fetch [pre-fetch address, offset, history, decision] | Applies upon execution, not necessarily tied to a particular load instruction. |

In systems AP1 and AP2, branch history is represented in the instructions themselves. The storage demands on the prediction-result tracker and the hint updater are minimal. Thus, these embodiments combine the advantages execution-time branch tracking for a program as a whole, rather only for that part that can be managed locally.

In a third illustrated embodiment of the invention, the prediction history is not limited to data that can be represented in the instructions themselves. Computer system AP3 comprises a processor 301, memory 303, an instruction cache 305, and a data cache 307. Processor 301 includes an execution unit 311, an instruction pipeline 313, an address generator 315, and a prediction tracker 317. Memory 303 stores an application program 321, data 323, and operating system 325, prediction history data 327, and a hint-updater program 329.

In system AP3, prediction tracker 317 stores prediction results as branch history data 327 in memory 303. The prediction can be whether or not certain data or instructions are actually required, whether or not the result of a calculation was predicted accurately, or whether or not some other predicted action or event occurred. An operating system 325 periodically interrupts application program 321 with hints and launches hint-updater program 329. Hint-updater program 329 analyzes branch history data 327 and determines the changes that need to be made to the hints in application program 321. The instructions needing changing are copied from instruction cache 305 to data cache 307, and then modified in data cache 307. The hint-modified cache copies of instructions can be written back to main memory according to the same rules applied to other data in data cache 307. Once the changes have been effected, operating system 335 resumes application program 331.

Figure 3:
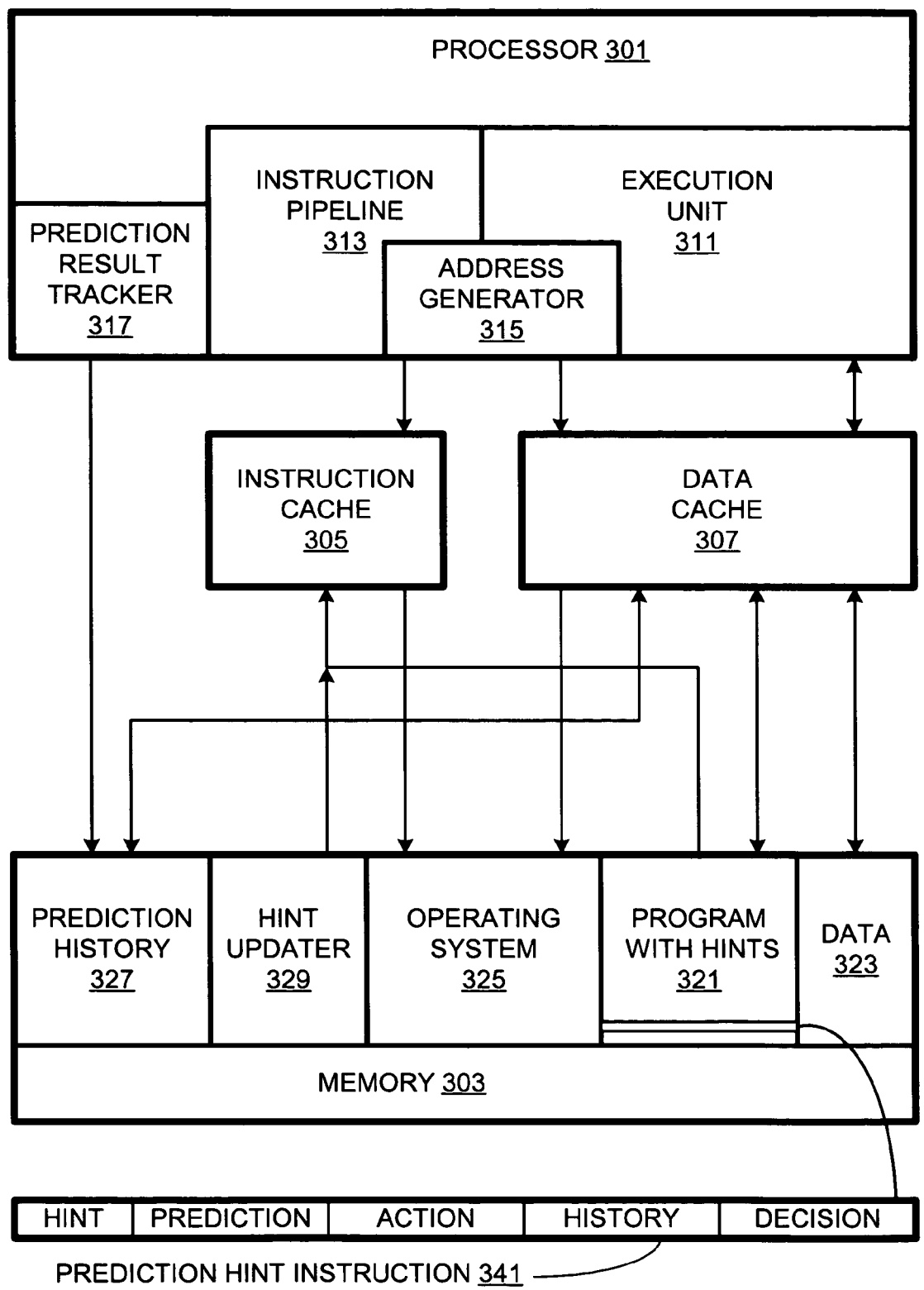
FIG. 3 is a block diagram of a third computer system in accordance with the present invention.

Systems AP1, AP2, and AP3 (FIGS. 1-3) all use program instructions for storing prediction history data in some form or other. This greatly expands the storage space available for prediction history relative to systems that are limited to on-processor storage. In many cases, these embodiments just make better use of instructions, e.g., no-op instructions, and do not require any expansion of program code. On the other hand, the amount of history data that can be stored in instructions without expanding the program (potentially reducing performance) is limited. System AP3 overcomes this limitation by allowing for prediction history data to be stored in memory but outside the program. This allows more a more detailed history to be maintained.

In particular, system AP3 more readily provides for more generalized hint-type instructions, such as prediction hint instruction 341. The parameters are a prediction, an action to be taken if the prediction is correct (and perhaps an action if the prediction fails), prediction history data, and a decision. The prediction history data can be expanded each representing a prediction result. This allows more precise statistics and also allows for patterns to be identified; both of these factors can lead to better predictions. The better prediction can be encoded as a single decision bit-either the prediction is true or false. Note that the history data can actually be stored in branch history 327, and the history field need only point to the location in which that history data is stored. In this case, the amount of history data is not constrained by the instruction width.

Note that parallel processing can be used to avoid the suspension of program 321 when updater 329 is running. For example, an auxiliary processor on the same integrated circuit as processor 301 can run updater 329. Alternatively, another processor in a symmetric or asymmetric multiprocessor system can run updater 329 while program 321 is running.

In an alternative embodiment, prediction history can be stored elsewhere, e.g., "on-chip" with the processor. For data not being used to affect instructions as they are being executed, extremely fast access times are not required. Therefore, the memory for prediction history can be larger (as it need not be fast and need not be very close to the execution unit). This alternative avoids some of the memory accesses required by system AP3.

Figure 4:
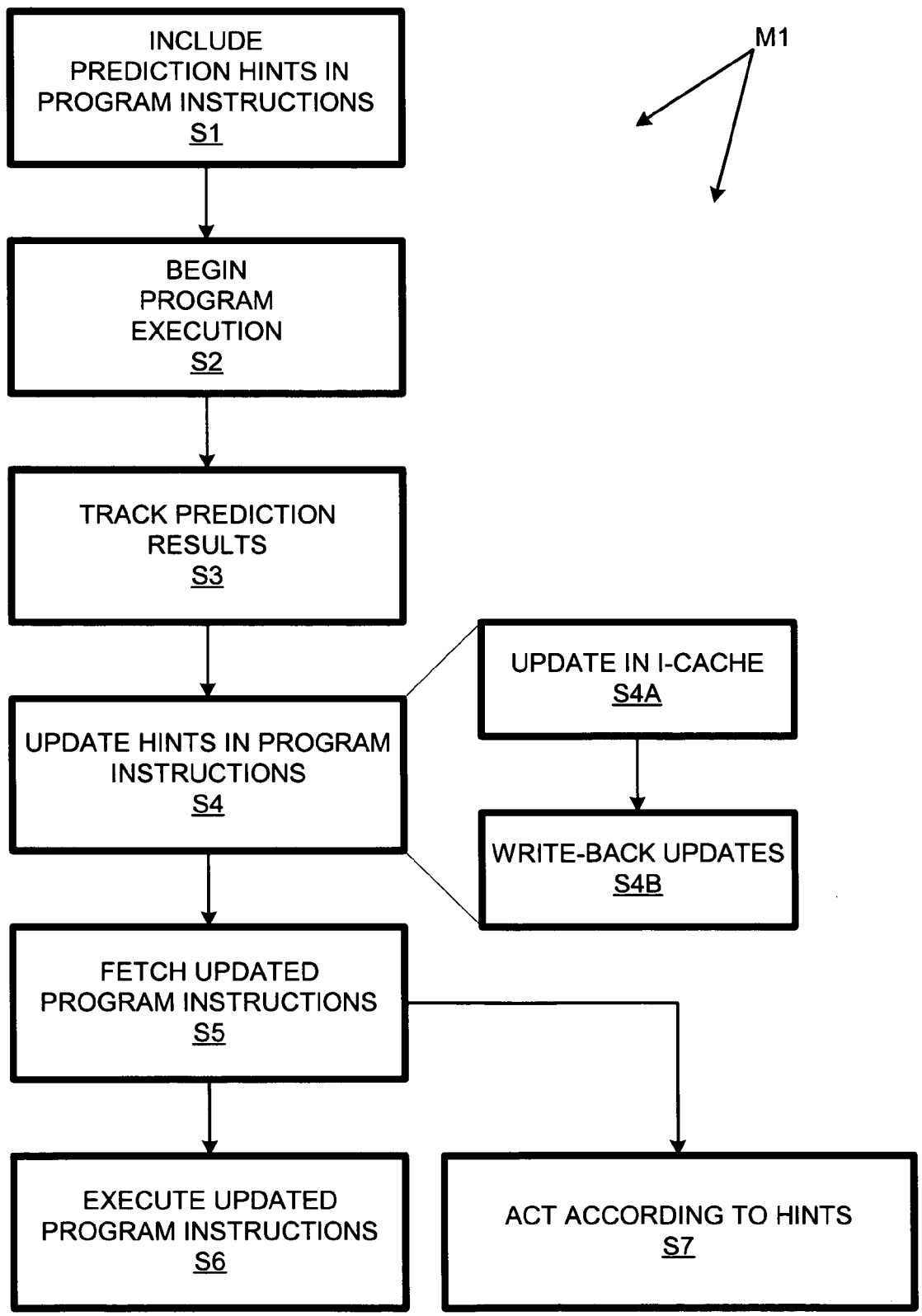
FIG. 4 is a flow chart of a method of the invention practiced in the context of the systems of FIGS. 1-3.

A method embodiment of the invention is flow-charted in FIG. 4. Variations of method M1 can be practiced in the contexts of systems AP1, AP2, and AP3 (of FIGS. 1-3). Step S1 involves including prediction hints in program instructions. The programmer(s) and/or compiler program are the likely sources of pre-runtime hints. In the case of branch instructions, the hints can include indications of which branches are likely to be taken and, (in the case of indirect branch instructions), which addresses are likely to be branch targets. In addition, offset values can be provided for indirect branch targets and data addresses that progress in an arithmetic fashion. Depending on the instruction format, the hints can be included in the branch instructions or other instructions to which the hints relate; in other cases, they can occur in hint-type no-op instructions that precede the subject instruction either immediately or otherwise.

Program execution begins with step S2. As the program is executing, prediction results are tracked at step S3. The prediction results specify whether or not a prediction is validated and, can provide a value, e.g., a branch target address for an indirect branch instruction. In systems AP1 and AP2 the tracking is a hardware only operation. In system AP3, step S3 also involves storing a prediction history in main memory.

Hints are updated at step S4. The "hint updater" can be part of the processor (as in system AP2), a program in memory (as in system AP3), or hardware or firmware separate from both, as in system AP1. An important distinction from other approaches is that the modification is to the instructions in their stored form—not just en route in an instruction pipeline or in an execution unit. The hint update results in an instruction that can be called again and handled differently because of coding in the program instructions themselves. The hints can be inserted into a subject instruction or into some other instruction designed to hint the subject instruction.

In step S4, the changes can be made in main memory as they are in system AP1, in a cache only, or in both, or in a cache that is written back to main memory (as in systems AP2 and AP3). In the latter case, substeps S4A and S4B can be distinguished: step 4A involves updating instructions in cache, while step S4B involves writing back updated instructions to main memory. The invention also provides for updating instructions in the cache and not writing back to main memory. In the case of system AP2, the cache size limits the amount of program code that can benefit from updating; however, in system AP3, branch results are stored in memory, so the memory space available to history data is generally much greater.

Herein two instructions are not the "same" if they occupy different positions in a program, even if the instructions are otherwise identical. For two execution instances of an instruction to involve the same instruction implies that both instances are based on the same instruction at the same position in the program.

At step S5, updated hint instructions are fetched (from cache or main memory) for execution at step S6. The instructions have been modified in a manner that will not affect substantive results, but actions based on the predictions can be affected at step S7.

The invention provides for generating hints "runtime", which means during execution of a program or an interruption thereof. The hints can be decisions (e.g., "pre-fetch the branch target") or factors (e.g., historical data) that can contribute to a decision to perform an action before it is known that the action will be required (or, in other words, before it is known that prerequisites for the action will be met). For example, a "pre-fetch hint" is a hint where the action is to fetch certain data or instructions before they are required according to the program order. For another example, a "value prediction" hint predicts a result of a calculation that has yet to be performed. "Hint performance data" is data representing with high or low precision how often a prediction represented in a hint is confirmed or disconfirmed.

An "outcome of execution", as the phrase used herein, encompasses confirmation upon execution of a prediction embodied in a hint. The outcome can also include other information such as a target address or a calculated value. An "execution instance" of an instruction refers to an instance in which an instruction is executed. An instruction can have multiple execution instances over time if the address at which it is stored is called repeatedly. Two identical instances of the same instruction type at different positions in the program order do not constitute two execution instances of the same instruction. Also herein, "write back" means copying an instruction or data from a cache to a higher-level cache or to some other memory, typically main memory. These and other variations upon and modification to the illustrated embodiments are provided for by the present invention, the scope of which is defined by the following claims.

What is claimed is:

1. A computing method comprising:
   executing a program of instructions stored in computer-readable storage media, said instructions including both
      branch-prediction hints for predicting the occurrence of a speculative branch or the address of a speculative branch target, and
      hint-performance data for distinguishing among plural likelihoods that a prediction based on a given hint will be fulfilled;
   tracking performances of said hints so as to generate updated hint-performance data;
   storing said updated hint-performance data in said program instructions without modifying an associated hint; and
   modifying said associated hint at a time determined at least in part as a function of said performance data.

2. A method as recited in claim 1 where at least one of said hints is a pre-fetch hint.

3. A method as recited in claim 2 wherein said pre-fetch hint is an instruction pre-fetch hint.

4. A method as recited in claim 3 wherein one of said instructions is a branch instruction including said pre-fetch hint.

5. A method as recited in claim 3 wherein one of said instructions is a branch instruction and another of said instructions includes said pre-fetch hint, said hint updater modifying said pre-fetch hint as a function of an outcome of execution of said branch instruction.

6. A method as recited in claim 5 wherein said hint updater also updates said branch instruction as a function of said outcome.

7. A method as recited in claim 2 wherein said pre-fetch hint is a data pre-fetch hint.

8. A method as recited in claim 2 wherein said hints specify addresses and address offsets.

9. A method as recited in claim 1 wherein said hint updater updates a copy of an instruction stored in main memory.

10. A method as recited in claim 1 wherein said hint updater updates a copy of an instruction stored in a cache.

11. A method as recited in claim 10 further comprising said cache, said cache writing back said instruction after it is updated.

12. A method as recited in claim 1 wherein at least one of said hints includes value-prediction hints.

13. A system comprising:
   an execution unit for executing programs that include branch instructions and hint instructions that include both branch-prediction hint data and hint-performance data for said branch instructions, said execution unit making pre-fetch determinations as a function of said hint data;
   a branch tracker for capturing branch outcomes when said branch instructions are executed; and
   a hint updater for updating the hint performance data associated with a hint without changing said hint as a function of said branch outcomes, and updating said hint data in said hint instructions at times determined at least in part as a function of said hint performance data so that different pre-fetch determinations can be made for different instances in which a given branch instruction is executed.

14. A system as recited in claim 13 wherein at least one of said hint instructions is not a branch instruction.

15. A system as recited in claim 13 wherein at least one of said hint instructions is one of said branch instructions.

16. A system as recited in claim 13 wherein said execution unit, said branch tracker, and said hint updater are fabricated on a monolithic integrated circuit.

17. A system as recited in claim 13 wherein said hint updater includes a hint-updater program.

18. A system as recited in claim 13 further comprising an instruction cache, said hint updater modifying copies of hint instruction in said instruction cache.

19. A system as recited in claim 18 wherein said instruction cache that writes modified hint instructions back to main memory.

20. A system as recited in claim 13 wherein said hint updater modifies instructions in main memory.

21. A system as recited in claim 13 wherein said branch tracker writes branch history data to memory and said hint updater is a program provides an analysis of said branch history data and modifies said hint instructions as a function of said analysis.

22. A method of executing a program of instructions comprising:
    making pre-fetch determinations as a function of a branch-prediction hint in a hint instruction;
    pre-fetching a target instruction in accordance with said pre-fetch determinations;
    tracking execution of said program so as to provide branch result data representing the outcomes of pre-fetch determinations;
    storing said result data in said instructions without modifying said hint; and
    modifying said branch-prediction hint at a time determined at least in part as a function of said result data.

23. A method as recited in claim 22 wherein said hint is located in a branch instruction and said storing involves modifying said branch instruction.

24. A method as recited in claim 22 wherein said hint is not a branch instruction.

25. A method as recited in claim 22 wherein said storing is performed on a copy of said hint instruction in main memory.

26. A method as recited in claim 22 wherein said modification is performed on a copy of said hint instruction in an instruction cache.

27. A method as recited in claim 26 further comprising writing back said hint instruction as modified in said cache to main memory.

28. A method as recited in claim 22 further wherein said tracking further comprises providing additional result data and modifying said hint as a result of said additional hint data.

* * * * *